United States Patent

[11] 3,634,768

[72] Inventors Earl W. Carpenter
Jefferson, Md.;
Jerome E. Hill, Annandale, Va.
[21] Appl. No. 874,874
[22] Filed Nov. 7, 1969
[45] Patented Jan. 11, 1972
[73] Assignee Radiation Systems, Inc.
McLean, Va.

[54] WIDE BANDWIDTH MICROWAVE MIXER CIRCUITS
9 Claims, 6 Drawing Figs.

[52] U.S. Cl. .......... 325/446, 321/69, 325/449, 325/450
[51] Int. Cl. .......... H03d 7/14
[50] Field of Search .......... 325/445, 446, 449, 450, 22, 24; 333/10, 11, 4; 321/69; 343/180

[56] References Cited
UNITED STATES PATENTS 3,417,317 12/1968 Kaufman .......... 321/69
3,532,989 10/1970 Saad .......... 325/449 X

OTHER REFERENCES

" Lumped Element Circuit Components," J. D. Cappucci; In Microwave Journal Jan. 1968.

*Primary Examiner*—Benedict V. Safourek
*Attorney*—Hurvitz and Rose

ABSTRACT: A symmetrical wide band microwave mixer is described which employs a unique microwave circuit and a pair of mixer diodes terminating a pair of transmission lines to a point of ground potential. The general purpose of this circuit is to provide a means for separating the input frequencies from the translated frequency of the mixer by using techniques which do not require the insertion of quarter-wave resonant or lumped-constant elements into the RF circuitry. In the circuitry proposed, 3 db. directional couplers are employed for two purposes: (1) to superimpose the input signals, and (2) to perform the diplexing function of separating the output signal from the input signals without loss of energy. The 3 db. coupler may be used to perform the diplexing function in either of two distinct ways: (1) one or more of the frequencies may be out of the coupler band and thus be transmitted along the conductor path through the coupler without energy loss; (2) the coupler and a pair of identical filters may be used to multiplex signals which are only slightly separated in frequency.

INVENTORS
EARL W. CARPENTER &
JEROME E. HILL

Hurvitz & Rose
ATTORNEYS

WIDE BANDWIDTH MICROWAVE MIXER CIRCUITS

BACKGROUND OF THE INVENTION

The present invention relates generally to frequency translation circuits, that is, circuits by which signals of one frequency or band of frequencies are translated to a distinct and different frequency or band of frequencies. Specifically, the invention is directed to microwave mixers which operate across bandwidths as great as 20 to 1.

A description of the relevant prior art may best be provided by reference to the conventional balanced microwave mixer circuit of FIG. 1. A four-port hybrid coupler 10 has a first port 11 to which RF signal is to be applied, a second port 12 to which the output of a local oscillator is to be applied, and a pair of output ports 13, 14. The output ports of the hybrid junction are connected respectively to the cathode and anode of oppositely poled mixer diodes 16 and 17, which may be the point-contact type. The anode and cathode of diodes 16 and 17, respectively, are connected together to provide an IF output junction. RF bypass capacitors 19 and 20 couple the IF output terminal 21 and diodes 16 and 17 to ground to provide and RF path to ground potential through the diodes. DC return paths, to points of ground potential, are provided on the other side (i.e., the RF side) of each of diodes 16 and 17 via what are depicted as choke coils 23 and 24, respectively. This type of conventional balanced mixer circuits provides inherent isolation between the RF signal input terminal and the local oscillator input terminal as a result of the symmetrical character of the hybrid junction 10.

In operation of the mixer of FIG. 1, RF signal energy is applied via the signal input terminal to port 11 of hybrid 10 and is divided and distributed equally to mixer diodes 16 and 17 via output ports 13 and 14, respectively. Similarly, local oscillator energy is applied to hybrid input port 12 and is evenly divided by the hybrid and fed to the mixer diodes. The RF signal voltage and local oscillator are superimposed at each hybrid output port. These hybrid outputs are incident on the mixer diodes. The nonlinear current-voltage characteristic of the diodes gives the desired heterodyne action. This heterodyning action produces the sum and difference frequencies of the RF and LO frequencies, in addition to numerous other harmonically related frequencies. In its most conventional form, only the difference frequency is desired as an output. This IF signal is coupled from the mixer diodes by use of low-pass filter networks at the output terminals. Since the difference frequency is usually much lower than the microwave input frequencies and the other heterodyned frequencies, the low-pass filters may be merely choke coils as depicted by 23 and 24 of FIG. 1. The two diode outputs are combined into a single IF output at the common junction between the diodes, and this output is taken from terminal 21.

For relatively narrow bandwidth operation, this type of mixer circuit is perfectly acceptable. Placement of RF bypass and IF output at one end of each mixer diode creates a reactive impedance at the RF end of each diode but for narrow bandwidths this reactance is readily canceled by use of a short-circuited stub in the RF line. Such an arrangement also provides the necessary DC return path. Thus, IF and DC connections are provided at either end of each mixer diode with maintenance of a matched condition to the RF line to obtain maximum signal conversion or frequency translation efficiency. Difficulties arise, however, when the circuit is to be utilized for wide bandwidth operation because of the impracticality of continued use of tuning stubs.

It is, therefore, a broad object of the present invention to provide microwave mixer circuits which overcome the problem areas of DC return and RF bypass connections that have resulted in intolerable impedances in attempts to redesign basic prior art mixer circuits for wide operational bandwidths.

Another object of the invention is to provide wide band frequency translation circuits or microwave mixer circuits in which simple, yet efficient, separation of RF and IF energies is achieved.

SUMMARY OF THE INVENTION

According to the invention, oppositely poled mixer diodes terminate a pair of transmission lines at ground potential, the mixer diodes connected to separate ones of a pair of ports on one side of a 3 db. quadrature directional coupler. The pair of ports on the other side of the coupler are connected to separate ones of the pair of transmission lines so that the lines are connected at either side of the coupler through the internal circuitry of the coupler. The coupler divides signal energy applied to either port of either pair of ports into phase-displaced equal amplitude components. Thus, RF signal energy applied to one port and local oscillator energy applied to the other port of the pair of ports on the side of the coupler opposite that to which the mixer diodes are connected, are superimposed and heterodyned at the mixer diodes. The resulting IF energy generated at the diodes propagages through the coupler to be combined at the IF output terminal of the circuit.

According to one embodiment of the invention, the RF signal energy and the local oscillator energy are applied to the respective transmission lines via separate halves of the symmetrical circuit, each half including a further 3 db. quadrature coupler for receiving the respective signal energy at one port, dividing it and applying the signals to respective filters for reflection back through the last-mentioned coupler where destructive combination of signal energy components occurs at the port to which the original signal energy is applied, and constructive combination occurs at the remaining port, which is connected to the respective transmission line. The IF energy reflected back along each transmission line is passed by the last-mentioned coupler and a filter connected thereto in each half of the symmetrical circuit, and is combined with the IF energy from the other half via respective coupling capacitors connected to the output terminals of the low-pass filters. Each of the filters has a cutoff frequency between the immediate frequency and the input frequencies to be processed. DC return lines are connected to the respective junctions between the coupling capacitors and the low-pass filters.

In a second embodiment of the invention, the filters are replaced by additional 3 db. quadrature couplers, which are connected in tandem to the other further 3 db. coupler in each respective half of the circuit. The second embodiment provides greater separation between RF and IF signal energies having widely disparate frequencies.

DESCRIPTION OF THE PREFERRED EMBODIMENTS

Figure 2A:
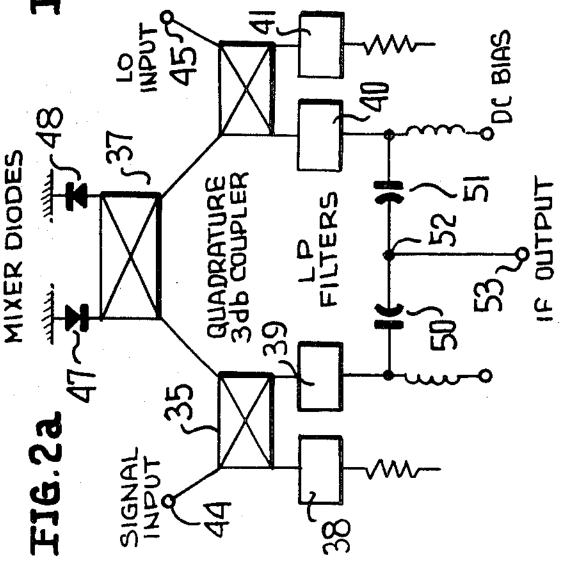
FIGS. 2*a*, *b*, and *c* are circuit diagrammatic views of one embodiment of the invention.

Referring now to FIG. 2*a*, a block diagram of one preferred embodiment of a symmetrical mixer circuit suitable for wide operational bandwidths, up to 20 to 1, the RF circuit includes three 3 db. quadrature directional couplers 35, 36, and 37, and four filters 38, 39, 40, and 41. Each of the quadrature couplers is of conventional type in the functional sense that signal energy applied to any port of any one of the four-port couplers is divided into equal amplitude, phase quadrature related signal components along direct and coupled paths to the opposite pair of ports for that coupler. Moreover, equal amplitude, phase quadrature related components applied to both ports, respectively, at one side of any coupler are destructively combined at one port on the other side and constructively combined at the other port on the other side, as a result of the energy splitting and phase shifting characteristics of the coupler.

Each of the 3 db. quadrature couplers may be of the strip transmission line tandem connected type as is disclosed in detail in U.S. Pat. application Ser. No. 485,723 of Shelton, titled "Wideband TEM Components," filed Sept. 9, 1965, and of common assignee. Some of the basic structural details of this type of component will be described in conjunction with the description of FIG. 2*b*.

RF signal energy is to be applied to one port of coupler 35, the other port on the same side connected to a port of coupler 37. The opposite pair of ports of the latter coupler are connected to respective oppositely poled, matched solid state diodes 47 and 48, the other sides of which are connected to points of ground potential. The other pair of ports of coupler 35 are connected to respective conventional filters 38 and 39, which are constructed and arranged to have a cutoff frequency between the intermediate frequency (IF) and the radio frequency (RF) and local oscillator frequency (LOF) to be handled by the circuit. For the most conventional mixer application, these filters are of the low-pass type with the cutoff frequency below the input and local oscillator frequency and passing the output frequency. However, the diversity of filter designs enables the designer to select any desired heterodyned signal. Thus, this mixer circuit may be used for up-conversion with the use of filters of the band pass or high-pass type to select the sum signal from the heterodyned output of the diodes.

The mixer circuit of FIG. 2*a* is symmetrical, with the local oscillator energy to be applied to input terminal 45 and thence to a port of coupler 36. The opposite pair of ports of coupler 36 are connected respectively to input terminals of filters 40 and 41, identical in all respects to filters 38 and 39. The remaining port of coupler 36 is connected to the remaining port of coupler 37. The output terminals of filters 38 and 41 are terminated in resistive impedances, whereas the output terminals of filters 39 and 40 provide DC return paths for the circuit, and are connected via respective IF bypass capacitors 50, 51 to a common junction 52 from which the IF output is to be taken at output terminal 53.

Figure 2B:
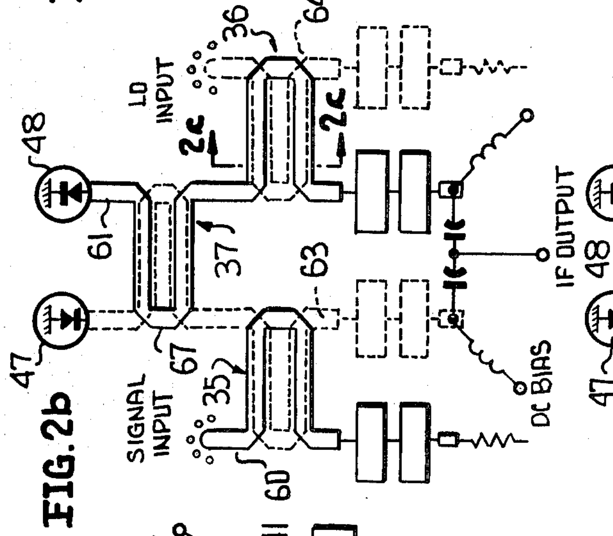

In practice, the couplers are preferably of the type shown in the strip transmission line layout diagram of FIG. 2*b* for the circuit of FIG. 2*a*. The strip line configuration is etched on either side of a single sheet of dielectric forming the middle layer of a three-layer copper-dielectric-copper package. Standard components, such as diodes and resistors and the low-pass filter units, may be connected in place after construction of the strip line regions. In FIG. 2*b*, the solid lines indicate copper paths (e.g., 60, 61) on the near side of the center dielectric layer, while the dashed lines represent copper circuit paths (e.g., 63, 64) on the far side of the dielectric sheet.

Figure 2C:
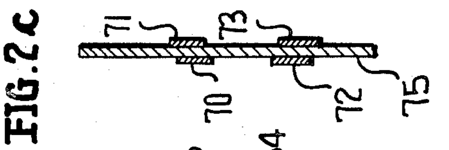

Each quadrature coupler, such as 37, consists of a pair of copper strip transmission lines on either side of the dielectric sheet, or more precisely, separate pairs of strip line sections of equal length, each pair of sections being laterally offset from and electromagnetically coupled to one another and preferably crossing each other at the center to symmetrically divide their lengths. Each pair of sections is connected in tandem to the immediately adjacent pair of sections, as at connection points designated 67, 68 for coupler 37. The tandem connection of several pairs of relatively loosely coupled sections provides tight coupling of the overall unit (coupler), much greater than is obtainable by reducing the separation between the strip lines with the attendant strict manufacturing tolerances. For a more complete discussion of the tandem-connected strip line pairs and their advantages, the reader is referred to the aforementioned Shelton application. It is sufficient to note that elimination of any requirement of critically close spacing between the strip line sections of any pair provides each coupler with extremely wide operational bandwidth capabilities. In FIG. 2*c*, pairs of strip line sections, such as 70, 71, and 73 are shown on opposite sides of dielectric sheets 75.

In operation of the mixer circuits of FIG. 2*a*, RF signal applied to input terminal 44 is divided into equal amplitude, phase quadrature related signal energy components by quadrature coupler 35, and these components are fed to respective low-pass filters 38 and 39. The signal energy is reflected from these low-pass filters back to the ports of coupler 35 from which it emanated, and is destructively combined at the port to which the original signal was applied and is constructively combined at the remaining port, connected to coupler 37. Thus, the combined energy is fed to coupler 37 and is equally divided for application to mixer diodes 47 and 48. The local oscillator energy is routed to the mixer diodes via a similar path in the other half of the symmetrical mixer circuit of FIG. 2*a* and is heterodyned with the RF signal energy at the mixer diodes to provide the IF difference energy. Since these IF energy components obtained after heterodyning do not bear the phase relationship necessary for destructive combination at either of the ports of coupler 37 on the side opposite the diodes, IF energy travels to both couplers 35 and 36, and is passed by filters 39 and 40 and coupling capacitors 50 and 51, and is combined at junction 52.

Figure 1:
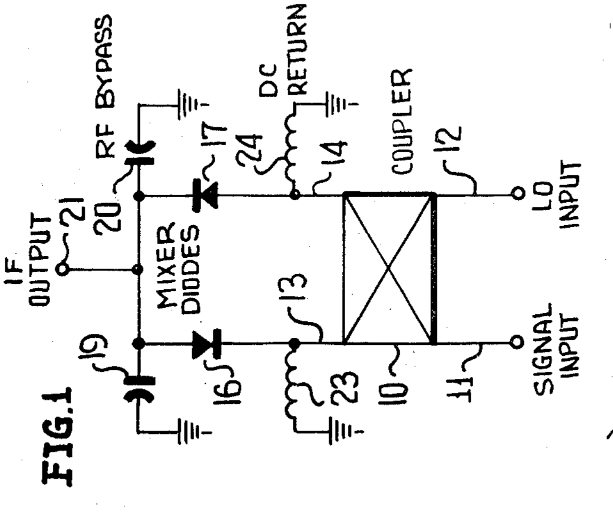
FIG. 1 is a circuit diagram of a prior art balanced microwave mixer circuit, previously described.

The symmetrical mixer circuit of FIG. 2*a* has several significant advantages over the most widely used basic prior art circuit of FIG. 1. These include (1) the absence of bypass capacitors at the ground connection side of the diodes, and hence the capability of solidly grounding each diode with a short circuit very close to the respective diode junction, so that low reactance is obtained without need for tuning to match RF energy into the junction; (2) the separation of RF and IF energies by use of frequency-sensitive components which are relatively easily fabricated into a strip transmission line configuration; and (3) the absence of any requirement of DC bias connection in the RF portion of the circuit.

Figure 3B:
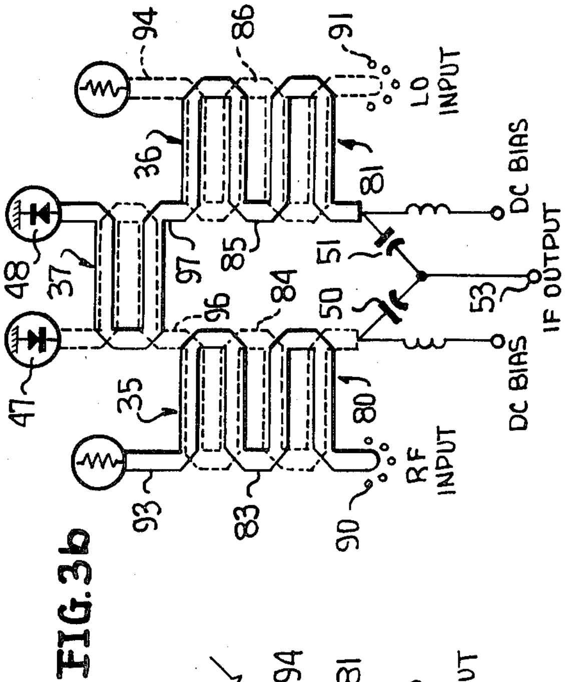
FIGS. 3*a*, and *b* are circuit diagrammatic views of a second embodiment.
Figure 3A:
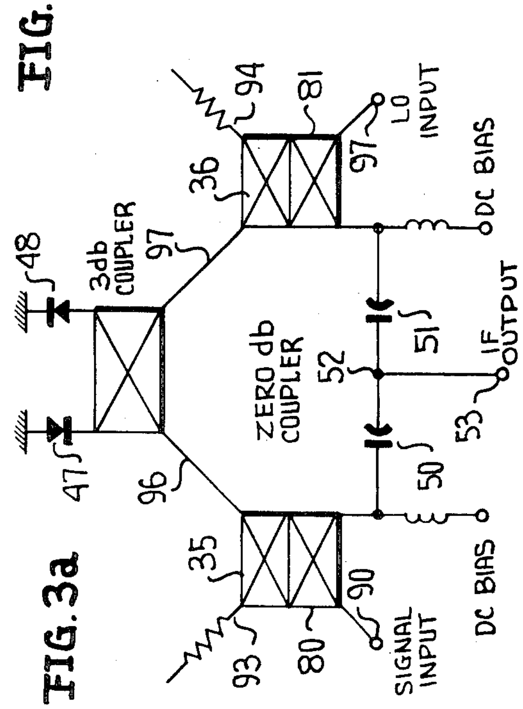

Referring now to FIG. 3*a*, another embodiment of a symmetrical mixer circuit according to the present invention employs two additional 3 db. couplers in place of the four filters used in the circuit of FIG. 2*a*. In particular the pair of ports of coupler 35 that had been connected to filters 38 and 39 in FIG. 2*a* are here connected in tandem to a pair of ports of any identical 3 db. quadrature directional coupler 80. The same structure occurs on the other side of the circuit, where coupler 36 is connected in tandem to coupler 81. In practice, using the strip transmission line configuration of FIG. 3*b* there need be no break in the continuity of the couplers at the tandem connection points, designated by reference numerals 83, 84, and 85, 86, for the respective connected pairs of couplers. The two tandem-connected 3 db. quadrature couplers of each pair effectively become single zero db. couplers since the signal energy appearing at the input terminal (e.g., RF input 90) is coupled entirely to the other copper path within the strip line configuration, because destructive combination occurs at the direct port (e.g., 93, 94). The same situation exists for both the local oscillator energy applied to terminal 91 and the RF signal energy applied to terminal 90. All the RF energy is fed to coupler 37 on line 96 and all the local oscillator energy is fed to that coupler on line 97.

Again, the RF and local oscillator are superimposed and the combination heterodyned at the mixer diodes 47, 48, and the resultant IF energy generated at the diodes travels back through coupler 37 and on to paths 96 and 97. The low-frequency characteristics of each zero db. coupler result in IF signal energy at only the output port associated with the copper path from the diodes. IF energy is therefore applied to each of coupling capacitors 50, 51 and combined at junction 52 where it is taken as an output from terminal 53. As in the circuit of FIG. 2*a*, DC return and bias is provided by connections to the opposite ends of coupling capacitors 50, 51, through respective choke coils.

The mixer circuit of FIG. 3*a* has the same advantages as that of FIG. 2*a*. The capability of selecting the sum frequency output can be achieved by designing the zero db. coupler sections to be one-half wavelength long at this sum frequency. Since these coupled transmission line couplers do not couple energy at this frequency, the sum frequency will appear unattenuated at the output point 53. In each circuit, point contact diodes, backward diodes, or Schottky-barrier diodes are suitable for the mixer diodes 47, 48.

We claim:

1. A symmetrical wide band mixer circuit, comprising first and second signal transmission lines, first and second matched diodes terminating said first and second signal transmission lines, respectively, to a point of ground potential, first directional coupler means interposed in said lines, respectively, for transferring signal energy appearing on either line at one side of said coupler means to both lines at the other side of said coupler means in substantially equal amplitude but phase-displaced signal components, means including further 3 db. directional couplers connected to said first directional coupler means and responsive to signal components deriving from signal energy that is transferred through said directional coupler means and said diodes and reflected from said point of ground potential for combining said signal components as an output signal of said circuit, separate sources of said signal energy, said sources providing local oscillator and radio frequency signals, respectively, and means DC biasing said diodes into identical nonlinear ranges of operations, in which said means including further 3 db. directional couplers includes second and third directional coupler means substantially identical to the first-mentioned directional coupler means and respectively connected to different ones of said first and second transmission lines in symmetrical fashion on one side of said first-mentioned directional coupler means, for respectively applying said local oscillator and radio frequency signals to said diodes through said first-mentioned directional coupler means, said diodes being oppositely poled, respectively, with respect to said point of ground potential.

2. The circuit according to claim 1, wherein each of the further directional coupler means is arranged and adapted to produce quadrature phase displacements between said signal components in either direction of signal energy transfer therethrough.

3. A microwave mixer, including a first directional four-terminal quadrature 3 db. coupler having a first direct path between its first and second terminals and a second direct path between its third and fourth terminals, said direct paths being electromagnetically intercoupled, a first diode connected between said second terminal and ground, a second diode connected between said fourth terminal and said ground, said diodes being oppositely poled with respect to said ground, a fifth terminal for application of local oscillator signal, a sixth terminal for application of radio frequency signal, a second directional four terminal quadrature 3 db. coupler means, a third directional four-terminal quadrature 3 db. coupler means, a seventh heterodyne frequency output terminal, said second coupler means including a direct path between said sixth terminal and said first terminal and an electromagnetically coupled path to said seventh terminal, said third coupler including a direct path between said fifth terminal and said seventh terminal and a coupled path to said third terminal.

4. The combination according to claim 3, wherein are included low-pass filters connected, respectively, between said second coupler and said seventh terminal and between said third coupler and said seventh terminal, said low-pass filters being arranged and adapted to pass said heterodyne frequency to said seventh terminal.

5. The combination according to claim 3, wherein are included fourth and fifth 3 db. directional couplers in cascade in said second and third 3 db. directional coupler means, respectively, said fifth and seventh terminals being connected directly to said fourth coupler and said sixth and seventh terminals being connected directly to said fifth coupler.

6. The combination according to claim 3, wherein is included means for applying DC bias to one of said diodes via said second coupler means and means for applying DC bias to the other of said diodes via second coupler means.

7. In a microwave mixer, a first 3 db. quadrature coupler, a second 3 db. quadrature coupler, a third 3 db. quadrature coupler, a first signal input terminal, a second signal input terminal, a first diode having its cathode directly connected to ground, a second diode having its anode directly connected to ground, said first and second couplers providing respectively a direct and a coupled path between said first signal input terminal and said second diode, said first and third couplers providing respectively a direct and a coupled path between said second signal terminal and said first diode, an output terminal for a heterodyne product of said first and second signals, said second coupler being arranged to provide a direct path between said first terminal and said output terminal, said third coupler being arranged to provide a direct path between said second terminal and said output terminal.

8. The combination according to claim 7, wherein said first and second couplers provide first series DC bias paths to said second diode only, and wherein said first and third couplers provide second series DC bias paths to said first diode only.

9. The combination according to claim 8, wherein is provided fourth and fifth directional 3 db. couplers respectively so connected in cascade between said first signal terminal and said second directional coupler and between said second signal terminal and said third directional coupler as to extend said DC bias paths.

* * * * *